(No Model.)
B. LAVIGNE.
APPARATUS FOR DECOLORIZING, FILTERING, &c., LIQUIDS.
No. 429,459. Patented June 3, 1890.
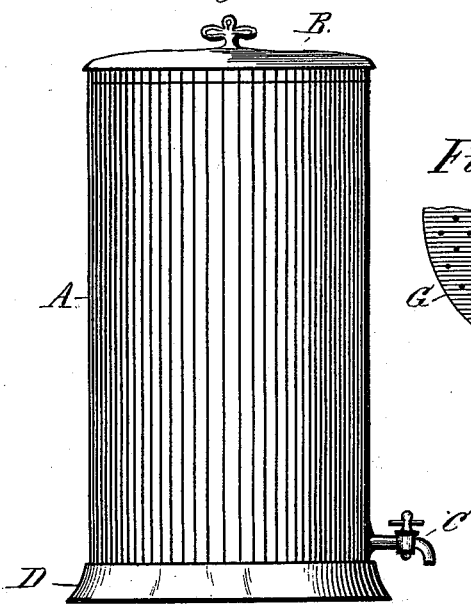
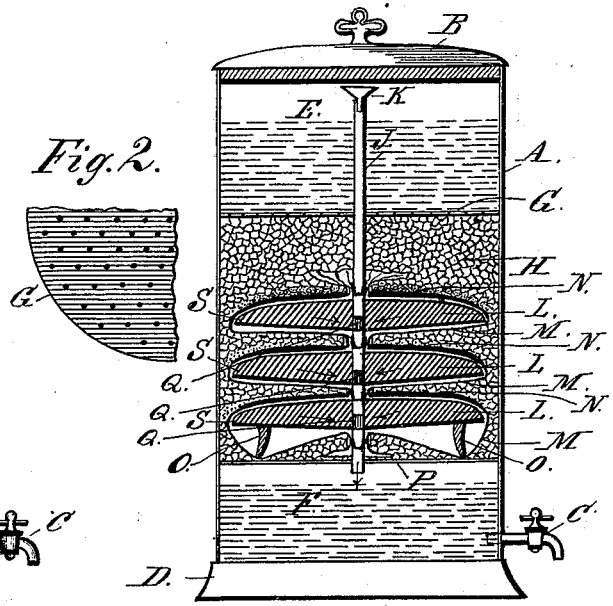
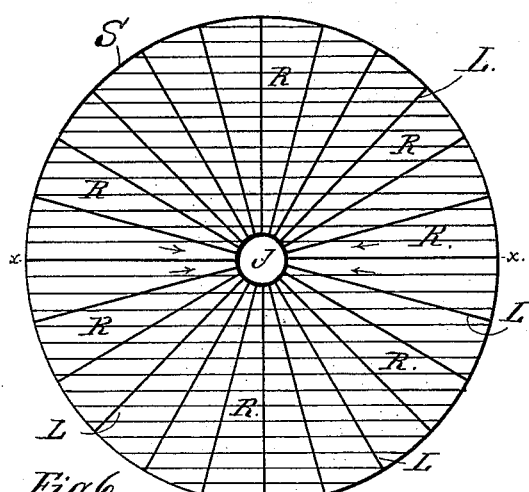
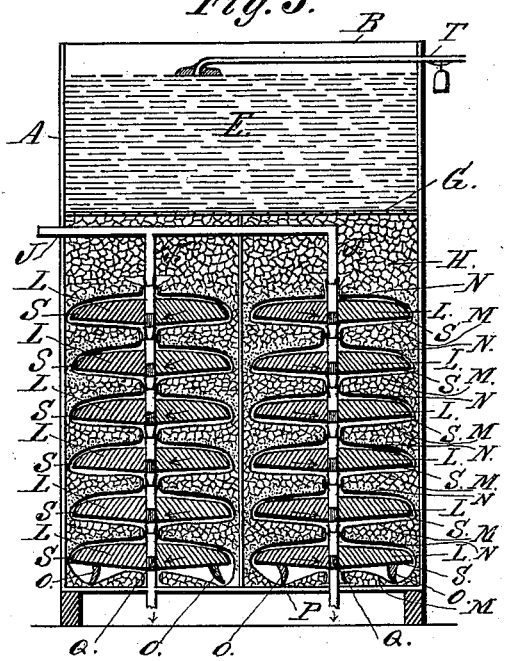
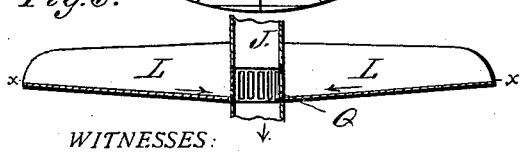
WITNESSES:
Helmuth Holtz
Percy D. Parks
INVENTOR
Basilide Lavigne.
by W. R. Stringfellow
Attorney

UNITED STATES PATENT OFFICE.

BASILIDE LAVIGNE, OF NEW ORLEANS, LOUISIANA.

APPARATUS FOR DECOLORIZING, FILTERING, &c., LIQUIDS.

SPECIFICATION forming part of Letters Patent No. 429,459, dated June 3, 1890.

Application filed January 18, 1890. Serial No. 337,400. (No model.)

*To all whom it may concern:*

Be it known that I, BASILIDE LAVIGNE, a citizen of the United States, residing at New Orleans, in the parish of Orleans and State of Louisiana, have invented certain new and useful Improvements in a Filtering and Decolorizing Apparatus; and I do declare the following to be a full, clear, and exact description of the invention, such as will enable others skilled in the art to which it appertains to make and use the same.

My invention relates to an improvement in an apparatus for decolorizing, clarifying, and filtering liquids—such as sugar-cane juice, water, and other liquids—by means of a filter clarification; and it consists of guttered frames joined together and provided with covering, through which the liquid passes into the frame or frames, and the objects of my invention are to filter cane-juice, water, and liquids in a rapid manner. I attain these objects by the mechanism illustrated in the accompanying drawings, in which—

Figure 1 is a side view of filter. Fig. 2 is a sectional top view of perforated plate. Fig. 3 is a sectional side view of filter. Fig. 4 is a top view of one of the guttered filter-frames. Fig. 5 is a sectional side view showing two series of guttered filtering-frames. Fig. 6 is a sectional side view of one of the guttered filter-frames.

Similar letters refer to similar parts throughout the several views.

In constructing my invention I use a guttered frame of a circular shape, as shown by S in Fig. 4.

L are vertical partitions which are held in a rigid position, and the inner ends of same are connected to a pipe or tube, as shown by J. Within said pipe or tube and between each partition L is an opening, as shown by Q, the letter R showing the space or gutter into which the filtered cane-juice or water enters after passing through the filtering material, and covering placed over the partitions L.

In constructing a filter for water I place my guttered frames in position, as shown in Fig. 3, the lower frame S resting upon a circular plate P, the tube extending through said plate.

O are legs or supports for lower frame S. Upon this lower frame S, I place two additional guttered frames S. These frames are provided with a covering, through which the liquid passes into the gutters, which are provided with a suitable outlet, as shown by Q, into which the filtered water or decolorized liquid passes. The covering M of these guttered frames may be of asbestus, cloth, felt, or brass cloth, or any desirable filtering material through which the liquid will pass. The frames S thus constructed are inclosed within a vessel, as shown by A in Fig. 1, B being a top; C, a cock; D, a base; E, a top chamber into which the unfiltered liquid or water is placed.

G is a perforated circular plate.

H is a filtering material placed around the frames S. This decolorizing, clarifying, or filtering medium may consist of any substance— such as vegetable charcoal, magnesia, or paper-pulp, which will be put into the said vessel, and upon said covering of gutter-frames I place animal charcoal, as shown by N. This layer of the filtering material furnishes the straining qualities of the cloth and arrests all the impurities.

J is a pipe for the admission of air, and upon one end of same is a funnel, as shown by K.

F is a chamber into which the decolorized liquid or filtered water is carried, and which may be drawn off by cock C, or the bottom ends of the pipe for the conducting of the filtered liquids from the interior of the frames may pass into a reservoir, from which the liquid can be drawn off in any manner desired. An air-pipe, as shown, can be placed at the top of the frames S, and extend either upward or to the sides of the vessel for the purpose of introducing air into the gutters, and this pipe may be furnished at the upper end with a mouth-piece to hold a sponge, cotton, or other material to prevent impurities from entering said pipe.

The frames S may be constructed of any desired material—such as iron, earthenware, glass, wood, and other non-oxidizable metal— and may be of any desired size or form, and when thus constructed are inclosed within a vessel, and, if desired, any number of such guttered frames may be placed within the same vessel and so arranged together as to present more surface of filtration to the liquid under treatment.

Water, cane-juice, or other liquid is introduced into the top of the vessel in which the guttered frames are arranged, and if required the interior of said vessel may be put into direct connection with the atmosphere through a pipe or pipes.

The vessel may be provided with an air-tight cover when the filtering or decolorizing is to be done by means of pressure, and may be provided with a valve or valves for the exit of air or steam during the operation. When cane-juice or other liquids to be filtered or decolorized are conducted from a cistern or other vessel by means of a pipe, it will also be furnished at the end of such pipe or pipes with a ball-cock, as shown by T, or any other automatic device to regulate the flow of the liquids to the vessel in which frames S are placed.

A striking advantage of my device is the large filtering-surface and the rapidity with which the filtration and decolorization may be accomplished.

Having fully described my invention, what I claim, and desire to secure by Letters Patent, is—

1. In a filter, the combination, with a vessel, of a circular frame therein having a series of vertical partitions rigidly secured thereto, and a pipe or tube at the center having slots in its sides registering with the spaces between the partitions, and a filtering material on the tops of said partitions, substantially as described.

2. In a filter, the combination, with a vessel, of a series of frames, each having a slotted pipe or tube at its center, vertical partitions secured to the frames and to the tubes between the slots, said frames being arranged one above the other, with the tubes connected with each other at their adjacent ends, and a filtering material over and around said frames, substantially as described.

3. In a filter, the combination, with a vessel, of a circular plate near the bottom, a frame supported on the plate by means of legs and having a pipe or tube at its center projecting down through the plate, a series of grooves in the upper portion of the frame, each communicating with the tube, other grooved frames above the lower frame, each having a tube which communicates with each other and with the tube of the lower frame, and filtering material above and around the frames, substantially as described.

4. In a filter, the combination, with a vessel, of a series of grooved frames, each having a tube or pipe at the center, said tubes communicating with each other, and an air-pipe communicating with the upper tube of the series of frames, substantially as described.

In testimony whereof I affix my signature in presence of two witnesses.

BASILIDE LAVIGNE.

Witnesses:
   PERCY D. PARKS,
   WILLIAM WILSON.